United States Patent
Bao et al.

(10) Patent No.: US 11,204,951 B2
(45) Date of Patent: *Dec. 21, 2021

(54) HIERARCHICAL TARGET CENTRIC PATTERN GENERATION

(71) Applicant: International Business Machines Corporation, Armonk, NY (US)

(72) Inventors: Shenghua Bao, San Jose, CA (US); Ying Chen, San Jose, CA (US); Anshu N. Jain, Sunnyvale, CA (US); Cartic Ramakrishnan, San Jose, CA (US); Maia A. Smith, Burnaby (CA)

(73) Assignee: International Business Machines Corporation, Armonk, NY (US)

( * ) Notice: Subject to any disclaimer, the term of this patent is extended or adjusted under 35 U.S.C. 154(b) by 763 days.

This patent is subject to a terminal disclaimer.

(21) Appl. No.: 15/049,844

(22) Filed: Feb. 22, 2016

(65) Prior Publication Data

US 2017/0097988 A1 Apr. 6, 2017

Related U.S. Application Data

(63) Continuation of application No. 14/874,638, filed on Oct. 5, 2015.

(51) Int. Cl.
*G06F 16/33* (2019.01)
*G06F 40/284* (2020.01)
*G06F 40/289* (2020.01)
*G06F 40/295* (2020.01)
*G06F 16/338* (2019.01)

(52) U.S. Cl.
CPC ........ *G06F 16/3344* (2019.01); *G06F 16/338* (2019.01); *G06F 40/284* (2020.01); *G06F 40/289* (2020.01); *G06F 40/295* (2020.01)

(58) Field of Classification Search
CPC .. G06F 16/3344; G06F 40/284; G06F 40/289; G06F 40/295
See application file for complete search history.

(56) References Cited

U.S. PATENT DOCUMENTS 6,745,181 B1 * 6/2004 Chang ................... G06F 16/338
7,174,047 B2 2/2007 Lin et al.
(Continued)

OTHER PUBLICATIONS

Defenders et al., Optimizing Rolling Hash Computation Using SIMD Vector Registers, An IP.com Prior Art Database Technical Disclosure, Apr. 16, 2013, pp. 1-4.
(Continued)

*Primary Examiner* — Neveen Abel Jalil
*Assistant Examiner* — Hubert Cheung
(74) *Attorney, Agent, or Firm* — Lieberman & Brandsdorfer, LLC

(57) ABSTRACT

The embodiments relate to generating hierarchical patterns based on a corpus of text. The corpus is analyzed, which includes extracting a set of features of the corpus. A set of grammatical patterns are generated based on the extracted features. The set of grammatical patterns includes at least one grammatical pattern generated from an internal pattern and at least one grammatical pattern generated from an external pattern. The grammatical patterns of the set are organized into a hierarchy and/or are ranked. The hierarchy and/or ranking are visually displayed.

19 Claims, 8 Drawing Sheets

(56) References Cited

U.S. PATENT DOCUMENTS

| | | | |
|---|---|---|---|
| 7,577,639 B2* | 8/2009 | Rege | G06F 16/367 |
| 3,244,718 A1 | 8/2012 | Chamdani et al. | |
| 8,640,017 B1* | 1/2014 | Chang | G06F 16/36 |
| | | | 715/200 |
| 9,396,287 B1* | 7/2016 | Bhave | G06F 16/3331 |
| 9,678,941 B2 | 6/2017 | Boguraev et al. | |
| 10,896,377 B2* | 1/2021 | Allen | G06F 16/3329 |
| 2004/0205737 A1* | 10/2004 | Margaliot | G06F 40/211 |
| | | | 717/143 |
| 2005/0108001 A1* | 5/2005 | Aarskog | G06F 17/271 |
| | | | 704/10 |
| 2005/0108630 A1* | 5/2005 | Wasson | G06F 17/241 |
| | | | 715/230 |
| 2006/0182046 A1 | 8/2006 | Dageville et al. | |
| 2006/0235843 A1* | 10/2006 | Musgrove | G06F 17/30616 |
| 2007/0050777 A1 | 3/2007 | Hutchinson et al. | |
| 2007/0220063 A1* | 9/2007 | O'Farrell | G06F 16/258 |
| 2009/0138793 A1* | 5/2009 | Verma | G06F 16/36 |
| | | | 715/234 |
| 2009/0254516 A1 | 10/2009 | Meiyyappan et al. | |
| 2010/0070502 A1 | 3/2010 | Zigon | |
| 2011/0246432 A1 | 10/2011 | Yang et al. | |
| 2011/0270604 A1* | 11/2011 | Qi | G06F 17/271 |
| | | | 704/9 |
| 2013/0073524 A1 | 3/2013 | Bentkofsky et al. | |
| 2013/0268534 A1* | 10/2013 | Mathew | G06F 16/35 |
| | | | 707/740 |
| 2014/0006861 A1* | 1/2014 | Jain | G06N 5/022 |
| | | | 714/26 |
| 2015/0051900 A1* | 2/2015 | Kimelfeld | G06F 17/2785 |
| | | | 704/9 |
| 2015/0142443 A1* | 5/2015 | Hwang | G06F 17/27 |
| | | | 704/257 |
| 2015/0331850 A1* | 11/2015 | Ramish | G06F 17/2785 |
| | | | 704/9 |
| 2015/0370781 A1* | 12/2015 | Galle | G06F 40/289 |
| | | | 704/9 |
| 2016/0012020 A1* | 1/2016 | George | G06F 17/2785 |
| | | | 704/9 |
| 2016/0147840 A1* | 5/2016 | Boguraev | G06F 3/0484 |
| | | | 707/731 |
| 2016/0357859 A1* | 12/2016 | Agarwal | G06F 40/211 |
| 2017/0004205 A1* | 1/2017 | Jain | G06F 17/30011 |
| 2017/0046311 A1* | 2/2017 | Walker | G06F 17/211 |
| 2021/0256541 A1* | 8/2021 | L'Huillier | G06Q 30/0282 |

OTHER PUBLICATIONS

Waterman, Scott A., Distinguished Usage, Corpus Processing for Lexical Acquisition, Chapter 1, pp. 1-29, 1994 MIT Press.

Hina, S., Semantic Tagging of Medical Narratives Using SNOMED CT, The University of Leeds School of Computing, pp. 1-192, Aug. 2013.

List of IBM Patents or Applications Treated as Related, Feb. 2016.

Tanabe, Lorraine et al., "Tagging Gene and Protein Names in Biomedical Text," Bioinformatics, Oxford University Press, vol. 18, No. 8, pp. 1124-1132 (2002).

Zhang, Min et al., "Semantic Role Labeling Using a Grammar-Driven Convolution Tree Kernel," IEEE Transactions on Audio, Speech, and Language Processing, vol. 16, No. 7, pp. 1315-1329 (2008).

* cited by examiner

Illustration of Pattern Ranking

```
POS Pattern = , <gene>              Recall = 0.0905493482309124 7
POS Pattern = IN <gene>             Recall = 0.046089385474860335
POS Pattern = IN <gene> CC          Recall = 0.038640595903165736
POS Pattern = DT <gene> NN          Recall = 0.033519553072625 7
POS Pattern = IN <gene> IN          Recall = 0.024906890130353 82
POS Pattern = -LRB- <gene> -RRB-    Recall = 0.024441340782122904
POS Pattern = IN <gene> NN          Recall = 0.022346368715083 8
POS Pattern = , <gene> NN           Recall = 0.020949720670391 06
POS Pattern = CC <gene> ,           Recall = 0.020949720670391 06
POS Pattern = IN <gene> NNS         Recall = 0.018854748603351956
```
↳ Ranked by Recall
202

```
POS Pattern = VB <gene> POS         Precision = 0.5
POS Pattern = JJS <gene> .          Precision = 0.333333333333333 33
POS Pattern = , <gene> CC           Precision = 0.33333333333333333
POS Pattern = WPS <gene> NN         Precision = 0.33333333333333333
POS Pattern = , <gene> ,            Precision = 0.306782334384858
POS Pattern = -LRB- <gene> -RRB-    Precision = 0.29411764705882354
POS Pattern = WRB <gene> VBD        Precision = 0.25
POS Pattern = WDT <gene> MD         Precision = 0.18333333333333332
POS Pattern = CC <gene> -LRB-       Precision = 0.17768595041322313
POS Pattern = -LRB- <gene> ,        Precision = 0.175
```
↳ Ranked by Precision
204

```
POS Pattern = , <gene>              F-score = 0.139827462257368 78
POS Pattern = IN <gene> ,           F-score = 0.065422104741450 52
POS Pattern = IN <gene> CC          F-score = 0.050364077669902 92
POS Pattern = -LRB- <gene> -RRB-    F-score = 0.045132172791747256
POS Pattern = DT <gene> NN          F-score = 0.043915827996340 35
POS Pattern = CC <gene> ,           F-score = 0.036474164133738 6
POS Pattern = , <gene> CC           F-score = 0.031578947368421054
POS Pattern = IN <gene> IN          F-score = 0.02960298796514041
POS Pattern = CC <gene> NNS         F-score = 0.028809704321455645
POS Pattern = CC <gene> ,           F-score = 0.027280477408354 65
```
↳ Ranked by F-score
206

HIERARCHICAL TARGET CENTRIC PATTERN GENERATION

CROSS-REFERENCE TO RELATED APPLICATION(S)

This application is a continuation patent application of U.S. patent application Ser. No. 14/874,638, filed Oct. 5, 2015, titled "Hierarchical Target Centric Pattern Generation", now pending, the entire contents of which is hereby incorporated by reference.

BACKGROUND

The embodiments described herein relate generally to textual language processing. More specifically, the embodiments described herein relate to generating patterns from a corpus of text.

Cognitive computing is the simulation of human thought processes in a computerized model; cognitive computing involves self-learning systems that use data mining, pattern recognition and natural language processing to mimic the way the human brain works. Rather than being programmed to anticipate every possible answer or action needed to perform a function or set of tasks, cognitive computing systems are trained using artificial intelligence and machine learning algorithms to sense, predict, infer, and in some ways, think. As we are moving towards the cognitive computing era, it is very important for a system to understand data content scattered across diverse geographic locations.

An important type of data content with respect to cognitive computing is textual content. Many algorithms and approaches have been proposed to understand and extract entities and relationships in text, which may be referred to as entity oriented mining. Entity oriented mining has various applications. For instance, entity oriented mining can help a medical researcher diagnose a disease, identify the cause of a disease, and appropriately treat the disease. Furthermore, entity oriented mining can assist in the field of medical research with discovery of new uses for existing pharmaceuticals, and can establish connections between a gene and species.

Machine learning approaches and rule based approaches have been proposed to detect entities from text. These approaches are very hard to scale to a new domain. This is especially true if the developer has limited knowledge about the system. Often time, these approaches are time and cost consuming, as the process of developing an entity annotator must be performed manually.

SUMMARY

The aspects described herein include a method for generating hierarchical patterns based on a corpus of text.

A computer-implemented method is provided for generating hierarchical patterns based on internal text and external context. The method includes analyzing the corpus for an annotated entity, which includes extracting a set of features of the corpus. A set of grammatical patterns are generated based on the extracted set of features. More specifically, the set of grammatical patterns includes at least one grammatical pattern generated from an internal pattern and at least one grammatical pattern generated from an external pattern. The grammatical patterns of the set are organized into a hierarchy or are ranked. The at least one performed action is visually displayed.

Other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments, and not all embodiments, unless otherwise explicitly indicated.

FIG. 2 depicts a block diagram illustrating pattern rankings based on exemplary set-based measures, according to an embodiment.

DETAILED DESCRIPTION

It will be readily understood that the components of the embodiments described herein, as generally described and illustrated in the Figures herein, may be arranged and designed in a wide variety of different configurations. Thus, the following detailed description of the embodiments of the method, computer program product, and system, as presented in the Figures, is not intended to limit the scope of the claims, but is merely representative of selected embodiments.

Reference throughout this specification to "a select embodiment," "one embodiment," or "an embodiment" means that a particular feature, structure, or characteristic described in connection with the embodiment is included in at least one embodiment. Thus, appearances of the phrases "a select embodiment," "in one embodiment," or "in an embodiment" in various places throughout this specification are not necessarily referring to the same embodiment.

The illustrated embodiments described herein will be best understood by reference to the drawings, wherein like parts are designated by like numerals throughout. The following description is intended only by way of example, and simply illustrates certain selected embodiments of devices, systems, and processes that are consistent with the claims herein.\

Figure 1:
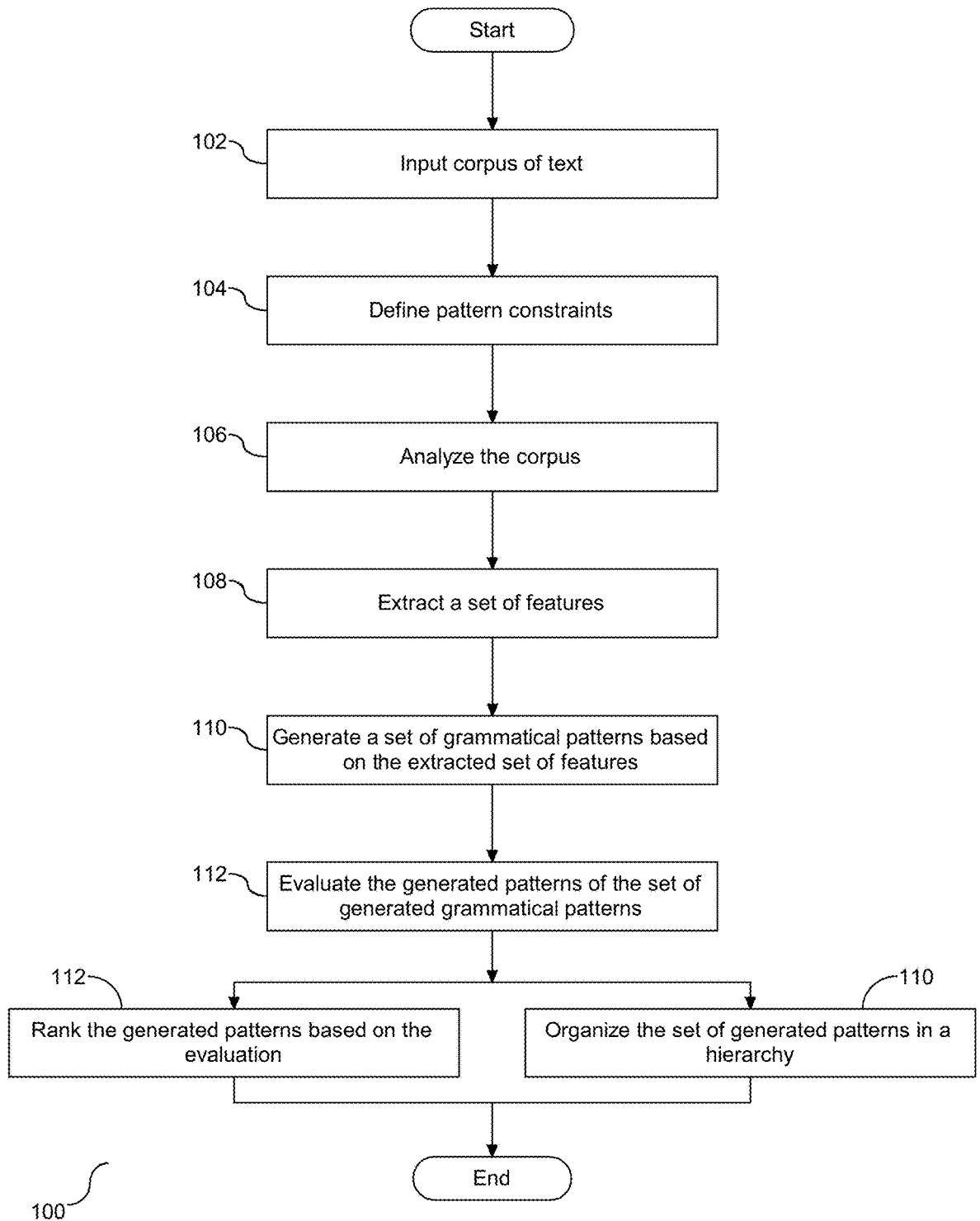
FIG. 1 depicts a flow chart illustrating a process for generating and organizing grammatical patterns, according to an embodiment.

FIG. 1 depicts a flow chart (100) illustrating a computer-implemented process for generating hierarchical patterns based on internal text and external context. A corpus of text is received for analysis (102). In linguistics, a corpus or text corpus is a large and structured set of texts, which may be electronically stored and processed. In addition, at least one defined pattern constraint is received (104). Such defined pattern constraints may be used to customize patterns that will be generated from the received corpus of text.

Following the receipt at steps (102) and (104), the corpus of text is analyzed (106), which in one embodiment includes extracting a set of features of the corpus (108). In one embodiment, the set of features of the corpus that are extracted include an annotated entity and an associated context of the entity. The annotated entity, as known in the art, is an entity that has a corresponding characterization that is configured to be computer readable for grammatical analysis. Typically, an individual (e.g., an expert, a researcher, etc.) manually annotates a desired entity of the corpus of text. The illustrative embodiments described herein with reference to FIGS. 2-4 below will make reference to a corpus of text that recites the following: "find that myosin contributes to." In these illustrative examples, the word "myosin" is underlined to denote that it is the annotated entity, and the associated context is the rest of the text of the corpus, namely "find that < > contributes to."

In one embodiment, the extracted features are tokenized, which includes tokenizing the annotated entity and the associated context. As is known in the art, tokenization is the process of translating a portion of text into meaningful (e.g., machine-readable) "tokens" for processing. In one embodiment, tokenization is performed utilizing a tokenizer.

A set of grammatical patterns is generated based on the extracted features from an internal pattern and an external pattern (110). In one embodiment, the internal pattern is a pattern associated with the annotated entity, and the external pattern is a pattern associated with the associated context of the entity. In other words, the internal pattern is composed of information about the annotated entity itself, while the external pattern is composed of information about the associated context. The grammatical patterns generated from the internal pattern include an internal surface-level pattern and an internal semantic-level pattern, and the grammatical patterns generated from the external pattern include an external surface-level and one or more external semantic-level patterns. The internal semantic-level pattern is generated based on the tokenized annotated entity, and each external semantic-level pattern is generated based on the tokenized associated context. In one embodiment, the set of grammatical patterns includes one or more combination patterns. A combination pattern is a pattern that is generated from the combination of at least two generated patterns. For example, a combination pattern may be a hybrid pattern generated from the combination of two generated patterns.

Exemplary pseudocode will now be provided for performing the pattern generation process described above, in accordance with the embodiments described herein:

Input: Corpus with training data labeled.
Step 1: Initialize pattern set P={ }, and context limit L.
Step 2: Generate internal pattern candidate. This step may be delineated into two steps, as follows:
   Step 2.1: For each term level representation of internal candidate TI, elaborate (TI, P), where TI is the term level representation of an internal candidate.
   Step 2.2: For each concept level representation (e.g., part-of-speech) of internal candidate CI, elaborate (CI, P), where CI is the concept level representation, e.g. part of speech, of the internal candidate.
Step 3: Generate external pattern candidate. Similarly, this step may be delineated into two steps, as follows:
   Step 3.1: For each term level representation of context TE with context size s≤L, and for each entity mention $m_1$, elaborate (TE, P), where TE is the term level representation of external content.
   Step 3.2: For each concept level representation of context CE with context size s≤L, and for each entity mention $m_1$, {elaborate (CE, P)}, where CE is the concept level representation of external context.
Output: pattern set P
Subroutine elaborate (Candidate c, Pattern P):
   For each number of substitution i<size of candidate c, substitute i token(s)/concept(s) in c with asterisk (*), and add all of the potential substitutions to P.

Further details with respect to the generation of the grammatical patterns are described below with reference to FIG. 3.

In one embodiment, the internal and external semantic-level patterns are internal and external part-of-speech-level patterns, respectively. It is to be understood and appreciated that a part-of-speech-level pattern is just one type of semantic-level pattern. Other examples of semantic-level patterns include, but are not limited to, a person-level pattern, a location-level pattern, sentence-structure-level pattern (e.g., subject-verb-object pattern), etc. Accordingly, the embodiments described herein are not limited to part-of-speech-level patterns.

One or more grammatical patterns of the generated set of grammatical patterns (e.g., pattern set P) is evaluated (112). The evaluation of the external patterns includes performing a statistical analysis to determine a relevancy of results with respect to each generated external pattern. The statistical analysis at step (112) may employ an information retrieval process whereby a query is submitted into an information retrieval system in order to find the most relevant results. According, each generated external pattern may be considered an input query associated with an information retrieval system.

In one embodiment, the evaluation at step (112) applies one or more set-based measures to the input generated external pattern. A set-based measure is a measure that evaluates the quality of an unordered set. Set-based measures include, for example, recall, precision, and F-score. Recall is the measure of the ability of a system to present all relevant items, and is represented mathematically as a quotient of the number of relevant items retrieved and the total number of relevant items. In other words, recall may be interpreted as the probability that a relevant item is retrieved from the query. Precision is the measure of the ability of a system to present only relevant items, and is represented mathematically as the quotient of the number of relevant items retrieved and the total number of items retrieved. The F-score is derived from the recall and precision measures, and is the weighted harmonic mean of precision and recall. Generally, F-score is represented mathematically as:

$$(1+x^2)(P \cdot R)/(x^2 \cdot P+R)$$

, where P represents precision, R represents recall, and x is a weight variable that may be adjusted depending on the desired precision-to-recall weight. Other types of set-based measures are known in the art, and may be utilized depending on the desired relevancy or quality analysis. Accordingly, each generated external pattern is evaluated to determine relevancy.

In one embodiment, each evaluated generated pattern is associated with evaluation data, such as evaluation metadata. From the evaluation at step (112), the external patterns may be ranked (114). In one embodiment, the external patterns are adaptively ranked. The ranking (114) may be performed manually. With reference to FIG. 2, various examples of pattern ranking are shown. Pattern rankings (200) include, for example, pattern ranking by recall (202), pattern ranking by precision (204), and/or pattern rankings by F-score (206). It is to be understood and appreciated that recall, precision, and F-score are examples of set-based measures and, as discussed above, the generated patterns may be evaluated and ranked based on different set-based measures not discussed herein.

Alternatively, from the evaluation at step (112), the generated patterns may be organized into a hierarchy (116). In one embodiment, the hierarchy is organized based on pattern generality. For example, a most general grammatical pattern, such as the internal pattern, may be placed at the first tier of the hierarchy. From there, the subsequent tier may include one or more of the next most general patterns that are derived from the first tier pattern. That is, the organization at step (116) is not based on a ranking of the patterns, such as the ranking that may be performed at step (114). Although a ranking is not required for organizing the generated grammatical patterns into a hierarchy at step (116), steps (114) and (116) may be performed simultaneously or sequentially, in any order, in order to both rank the generated grammatical patterns and organize the generated patterns to perform a more detailed analysis. A more detailed description of the organization of the generated set of grammatical patterns in the hierarchy will be described below with references to FIG. 4.

Then ranked patterns at step (114) and/or the organized patterns at step (116) are visually displayed (118). For example, the ranked and/or organized patterns may be displayed in a manner similar to the illustrative embodiments depicted in FIGS. 2 and 4, respectively. Accordingly, FIG. 1 describes and demonstrates a method for generating various internal and external patterns based on an analysis performed on a corpus of text, and displaying the generated patterns as a ranked collection of grammatical patterns, and/or as an organized hierarchy of grammatical patterns.

Figure 3:
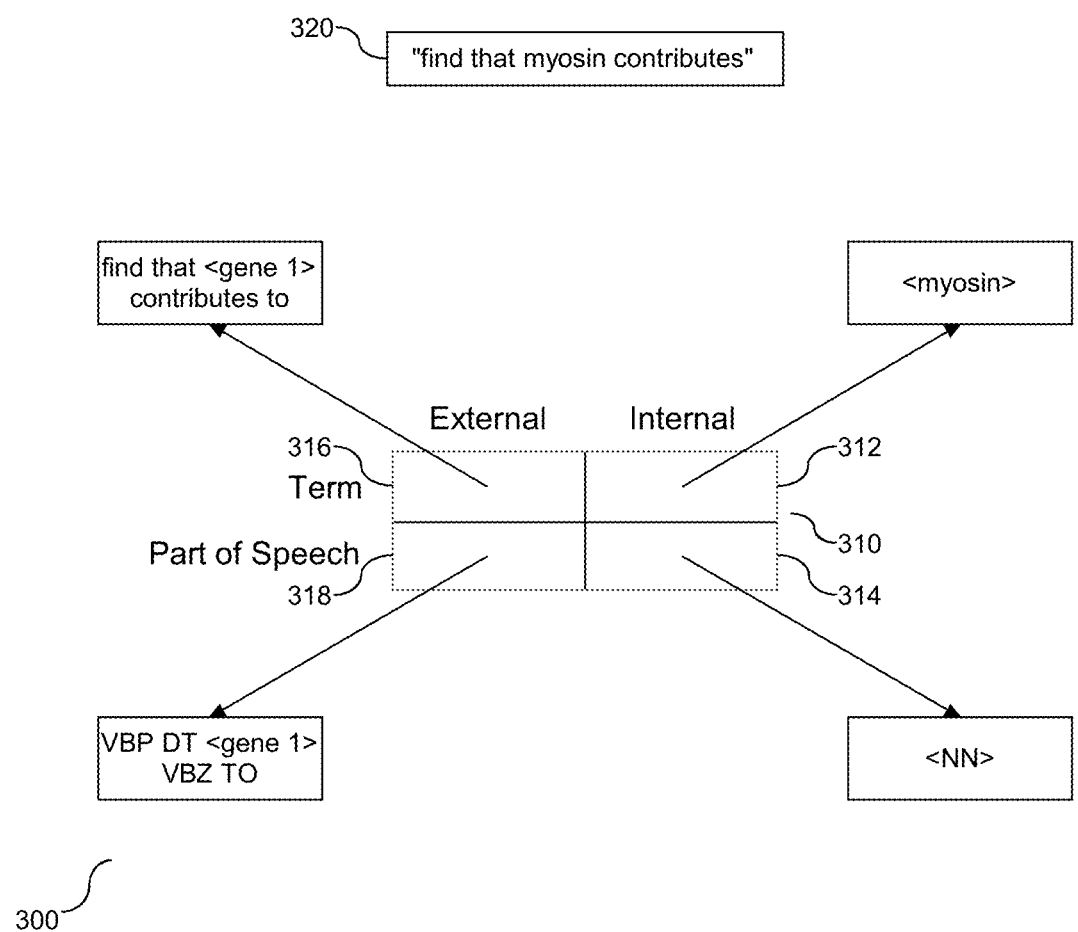
FIG. 3 depicts a block diagram illustrating an example of generated grammatical patterns, according to an embodiment.

With reference to FIG. 3, a block diagram (300) is provided illustrating an example of the generated patterns. The block diagram (300) is a representation of a matrix (310). In this example, the matrix is comprised of two columns and two rows, thereby forming quadrants (312)-(318). In one embodiment, quadrant (312) corresponds to an internal surface-level pattern, quadrant (314) corresponds to an internal semantic-level pattern, quadrant (316) corresponds to an external surface-level pattern, and quadrant (318) corresponds to an external semantic-level pattern. In one embodiment, and as shown herein, the surface-level pattern is a term pattern, and the semantic-level pattern is a part-of-speech level pattern.

Input data in the form of corpus of text is shown at (320). In this example, the corpus of text states "find that myosin contributes to." The annotated entity is "myosin" and the context is "find that < > contributes to." In one embodiment, the annotated entity represents the internal pattern, and the context represents the external pattern. Based on the example corpus of text shown herein, the internal surface-level pattern (312) that corresponds to the corpus (320) is <myosin>, and the internal part-of-speech-level pattern (314) that corresponds to the corpus (320) is <NN>. As is known in the art, <NN> designates a singular common noun (as opposed to a singular proper noun, which is designated as "NNP"). Accordingly, in this example, the internal surface-level pattern is the annotated entity (i.e., the term), and the internal part-of-speech-level pattern designates the part of speech of the annotated entity (i.e., a semantic-level pattern of the term).

As further shown, the external surface-level pattern (316) that corresponds to the corpus (320) is "find that <gene1> contributes to." One example of an external part-of-speech-level pattern (318) that corresponds to the corpus (320) is "VBP DT<gene1> VBZ TO." As is known in the art, "VBP" designates a present tense verb that is not third person singular, "DT" designates a determiner, "VBZ" designates a third person singular present tense verb, and "TO" designates the use of "to" as a preposition or infinitive marker. In this example, the external surface-level pattern is an external term combined with the associated context, and the external part-of-speech-level pattern designates the parts of speech of the external surface-level pattern. Accordingly, the external part-of-speech-level pattern may be viewed as a generalized version of the external surface-level, or term-level, pattern.

The external part-of-speech-level pattern (318) is not intended to be limiting. Other examples of external part-of-speech-level patterns include VBP DT<gene1>, DT<gene1>, <gene1> VBZ TO, <gene1> VBZ, etc. That is, multiple external part-of-speech-level patterns may be generated from the context, ranging in various levels of generality.

The input to the generated external patterns, <gene1>, represents a one-token gene. That is, the external patterns will be generated based around a one-term gene phrase. In other embodiments, a two-term gene phrase, <gene2>, may be used as an input, a three-term gene phrase, <gene3>, may be used as an input, etc.

Figure 4:
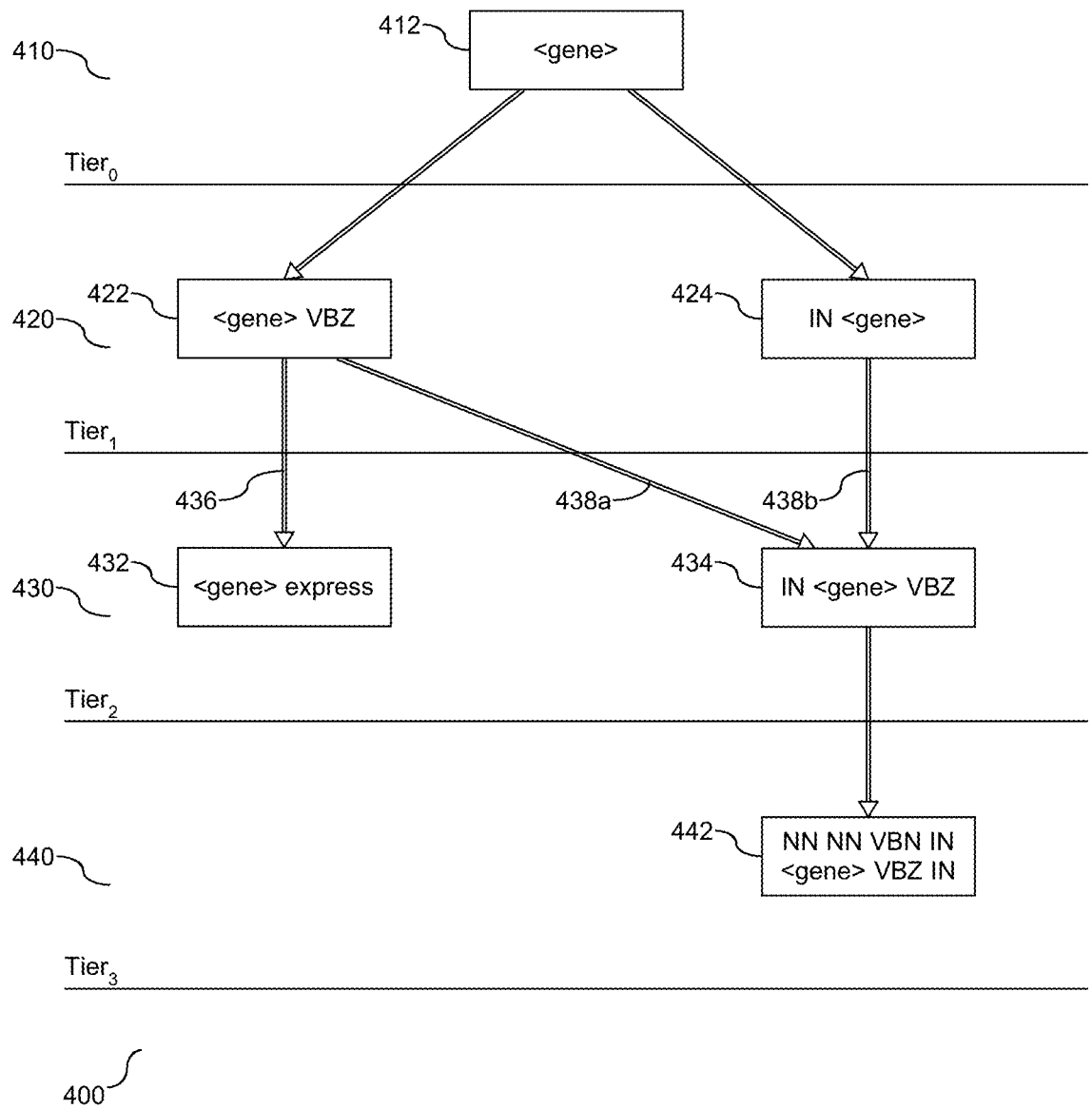
FIG. 4 depicts a block diagram illustrating an example of the organization of generated patterns in a hierarchy, according to an embodiment.

Once a desired number of external patterns are generated, they may be organized into a hierarchy. With reference to FIG. 4, a block diagram (400) is provided illustrating an example of organizing the generated patterns into a hierarchy. The example hierarchical organization shown herein is based on the example corpus of text at (320). As described in detail, the hierarchy shown herein includes multiple tiers. The hierarchy is based around the term "gene." The root node (412) corresponds to the most basic external grammatical pattern <gene>. As shown, the root node (412) is in the first tier, $Tier_0$ (410). The next generation in the hierarchy is shown and represented as the second tier, $Tier_1$ (420). This tier may include patterns corresponding to a single token surrounding the term <gene>. In the example shown herein, the second tier includes node (422) corresponding to the pattern "<gene> VBZ," and node (424) corresponding to the pattern "IN<gene>." The tokens VBZ and IN are not intended to be limiting, and are being used as examples to illustrate the organization of the patterns in a hierarchy. It is to be understood that the patterns corresponding to nodes (422) and (424) are examples of patterns that may be generated from the pattern corresponding to the corpus of text represented in the root node (412), and it is to be appreciated that alternative and/or additional patterns may be generated from the pattern corresponding to root node (412).

There are four tiers shown in this example hierarchy. The third tier, $Tier_2$ (430), corresponds to patterns that may be generated from sub-patterns of the second tier (420), such as nodes (422) and (424). As shown, the third tier (430) includes two nodes (432) and (434). Node (432) is shown at (436) as related to the sub-pattern shown in node (422) in the second tier (420). Node (432) corresponds to the pattern "<gene> expresses." In this example, and as previously discussed, "VBZ" designates a third person singular present tense verb. The verb "expresses" is a specific version of the more general VBZ-type verb. It is to be understood that the verb "expresses" is being used herein as an example, and it is to be appreciated that any third person singular present tense verb may be considered with respect to pattern generation and organization Node (434) is shown at (438a) and (438b) as related to the sub-patterns shown in nodes (422) and (424) in the second tier (420), respectively. Node (434) corresponds to the pattern "IN<gene> VBZ." In this example, node (434) corresponds to a combination pattern generated from nodes (422) and (424). Specifically, in this example, node (434) corresponds to a hybrid pattern. The pattern in node (434) is provided to illustrate an example of a hybrid pattern. In an alternative embodiment, the pattern in node (434) may correspond to a combination pattern generated from more than two nodes, or a more specific version of the pattern in node (424), such as "VBN IN<gene>." It is to be understood that the hybrid pattern in node (434) is an example of one pattern that may be generated, and it is to be appreciated that other and/or additional patterns may be generated from the pattern shown in node (422) and/or the pattern shown in node (424). Accordingly, external grammatical patterns may be generated based on a combination of two or more external grammatical patterns.

The example hierarchy shown herein includes four tiers, with the fourth tier referred to as Tier$_3$ (440). This tier is shown with a single node (442) that corresponds to the pattern "NN NN VBN IN<gene> VBZ IN." That is, the pattern in node (442) corresponds to "singular noun, singular noun, past participle verb, preposition/conjunction, <gene>, $3^{rd}$ person singular present tense verb, preposition/conjunction." The pattern in node (442) is provided to illustrate a specific part-of-speech-level pattern based on a more generalized part-of-speech-level pattern. It is to be understood that the specific pattern in node (442) is just one example of a pattern that may be generated and organized within the hierarchy, and it is to be appreciated that other and/or additional patterns may be generated. The goal of the hierarchy is to find a pattern that is most applicable to the input corpus text. The leaf node at (442) is a representation of the pattern that is most applicable to the input corpus text shown at (320).

Figure 5:
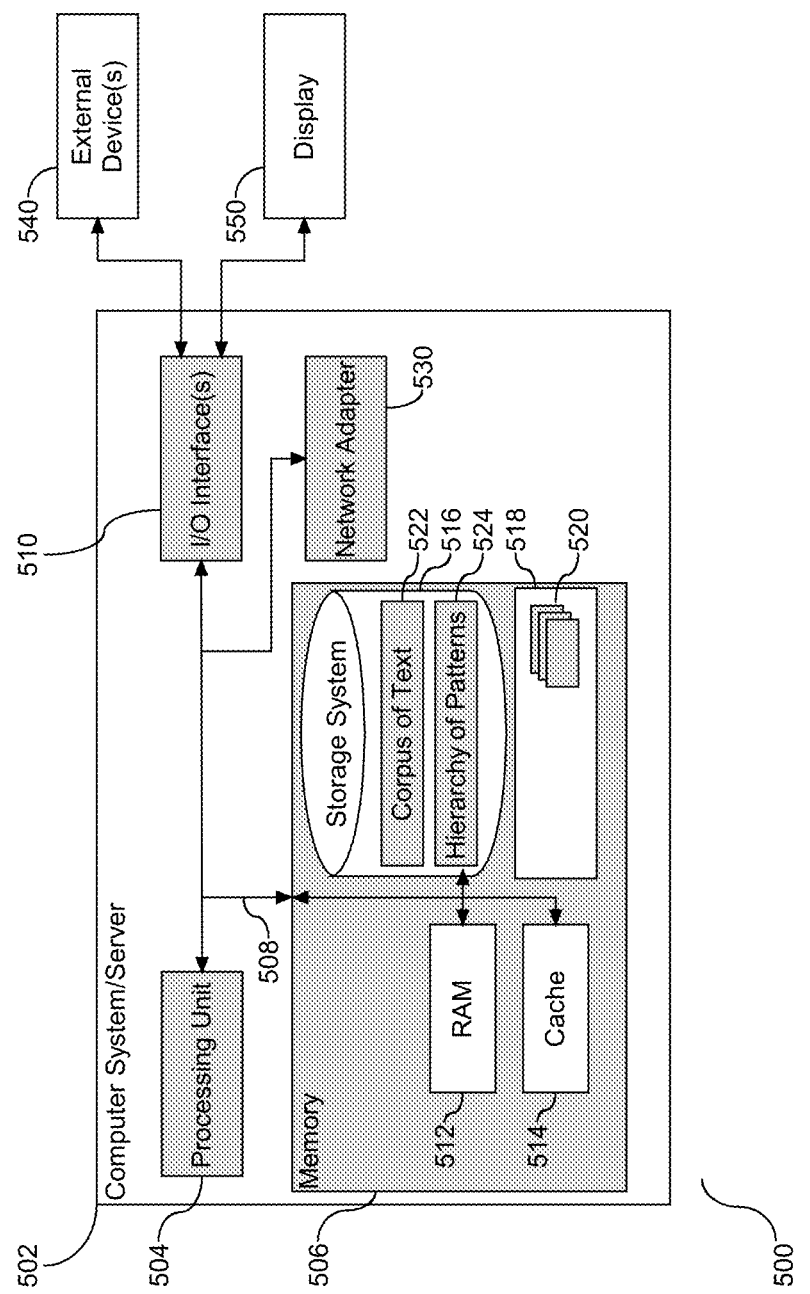
FIG. 5 depicts a block diagram illustrating a system to perform the process of FIG. 1, according to an embodiment.

With reference to FIG. 5, a block diagram (500) is provided illustrating an example of a computer system/server (502), hereinafter referred to as a host (502), for implementing the process described in the context of FIG. 1. Host (502) is operational with numerous other general purpose or special purpose computing system environments or configurations. Examples of well-known computing systems, environments, and/or configurations that may be suitable for use with host (502) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Host (502) may be described in the general context of computer system-executable instructions, such as program modules, being executed by a computer system. Generally, program modules may include routines, programs, objects, components, logic, data structures, and so on that perform particular tasks or implement particular abstract data types. Host (502) may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, host (502) is shown in the form of a general-purpose computing device. The components of host (502) may include, but are not limited to, one or more processors or processing units (504), a system memory (506), and a bus (508) that couples various system components including system memory (506) to processor (504). Bus (508) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (502) typically includes a variety of computer system readable media. Such media may be any available media that is accessible by host (502) and it includes both volatile and non-volatile media, removable and non-removable media.

Memory (506) can include computer system readable media in the form of volatile memory, such as random access memory (RAM) (512) and/or cache memory (514). Host (502) further includes other removable/non-removable, volatile/non-volatile computer system storage media. By way of example only, storage system (516) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (508) by one or more data media interfaces. As will be further depicted and described below, memory (506) may include at least one program product having a set (e.g., at least one) of program modules that are configured to carry out the functions of the embodiments described herein. In one embodiment, a corpus of text (522) is stored in one or more components of memory (506) upon receipt.

Program/utility (518), having a set (at least one) of program modules (520), may be stored in memory (506) by way of example, and not limitation, as well as an operating system, one or more application programs, other program modules, and program data. Each of the operating systems, one or more application programs, other program modules, and program data or some combination thereof, may include an implementation of a networking environment. Program modules (520) generally carry out the functions and/or methodologies of embodiments as described herein. For example, the set of program modules (520) may include at least one module that is configured to analyze the received corpus of text, extract a set of features of the corpus, generate a set of grammatical patterns based on the extracted set of features, organize the generated grammatical patterns into a hierarchy, and rank the generated grammatical patterns. The hierarchy of patterns (524) may be stored in one or more components of memory (506).

Host (502) may also communicate with one or more external devices (540), such as a keyboard, a pointing device, etc.; a display (550); one or more devices that enable a user to interact with host (502); and/or any devices (e.g., network card, modem, etc.) that enable host (502) to communicate with one or more other computing devices. Such communication can occur via Input/Output (I/O) interface(s) (510). Still yet, host (502) can communicate with one or more networks such as a local area network (LAN), a general wide area network (WAN), and/or a public network (e.g., the Internet) via network adapter (530). As depicted, network adapter (530) communicates with the other components of host (502) via bus (508). In one embodiment, the corpus of text (522) may be received by a server and communicated by the network adapter (530) to memory (506) via bus (508) for storage. It should be understood that although not shown, other hardware and/or software components could be used in conjunction with host (502). Examples, include, but are not limited to: microcode, device drivers, redundant processing units, external disk drive arrays, RAID systems, tape drives, and data archival storage systems, etc. In one embodiment, the ranked patterns and/or the organized patterns may be visually output on the display (550).

As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 6:
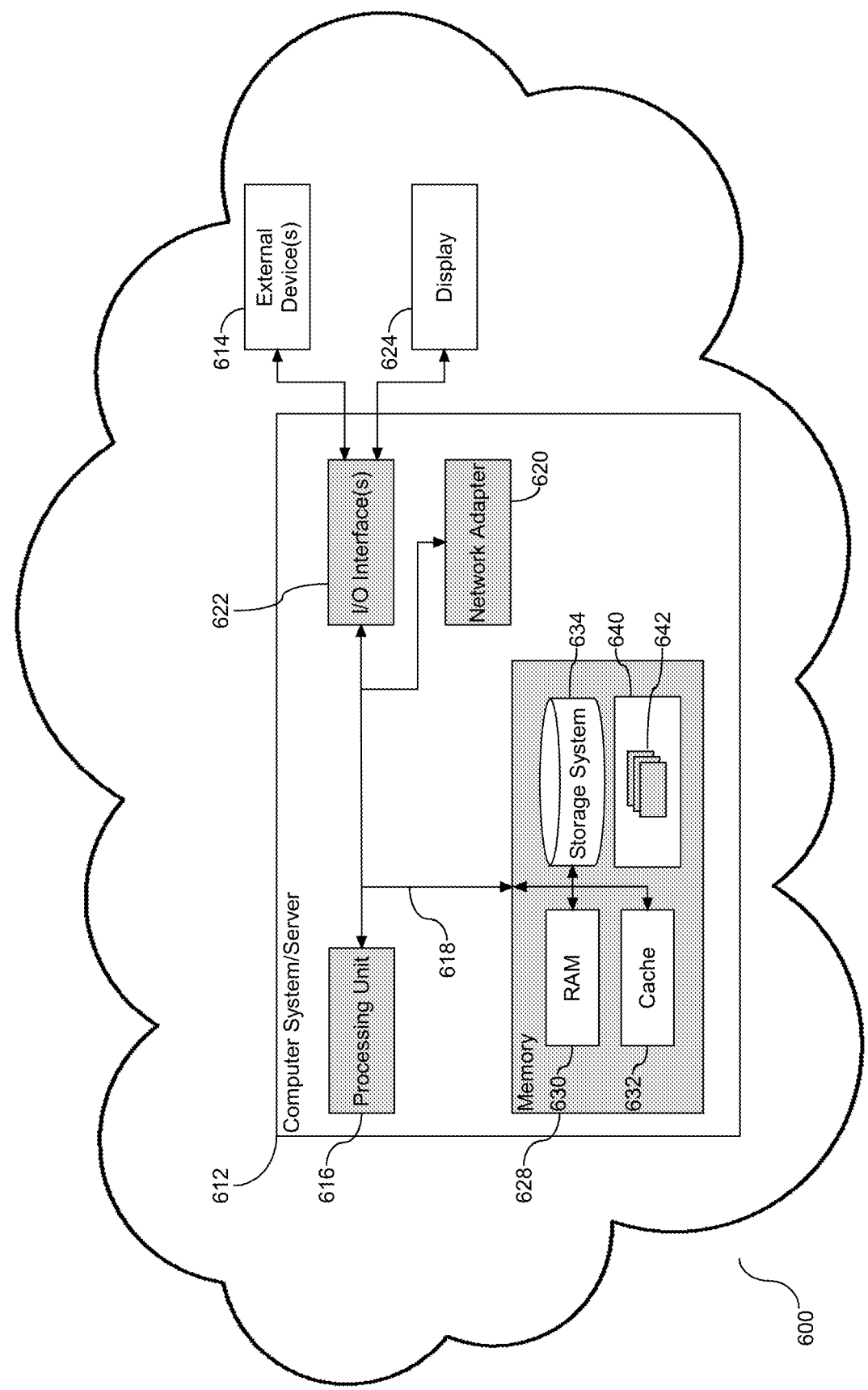
FIG. 6 depicts a schematic example of a cloud computing node.

Referring now to FIG. 6, a schematic of an example of a cloud computing node (600) is shown. Cloud computing node (610) is only one example of a suitable cloud computing node and is not intended to suggest any limitation as to the scope of use or functionality of the embodiments described herein. Regardless, the cloud computing node is capable of being implemented and/or performing any of the functionality set forth hereinabove.

In cloud computing node (610) there is a computer system/server (612), which is operational with numerous other general purpose or special purpose computing system environments or configurations. Examples of well-known computing systems, environments, and/or configurations that may be suitable for use with computer system/server (612) include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server (612) may be described in the general context of computer system executable instructions, such as program modules, being executed by a computer system. Generally, program modules may include routines, programs, objects, components, logic, data structures, and so on that perform particular tasks or implement particular abstract data types. Computer system/server (612) may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server (612) in cloud computing node (610) is shown in the form of a general-purpose computing device. The components of computer system/server (612) may include, but are not limited to, one or more processors or processing units (616), a system memory (628), and a bus (618) that couples various system components, including system memory (628) to processor (616).

Bus (618) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server (612) typically includes a variety of computer system readable media. Such media may be any available media that is accessible by computer system/server (612), and it includes both volatile and non-volatile media, removable and non-removable media.

System memory (628) can include computer system readable media in the form of volatile memory, such as random access memory (RAM) (630) and/or cache memory (632). Computer system/server (612) may further include other removable/non-removable, volatile/non-volatile computer system storage media. By way of example only, storage system (634) can be provided for reading from and writing to a non-removable, non-volatile magnetic media (not shown and typically called a "hard drive"). Although not shown, a magnetic disk drive for reading from and writing to a removable, non-volatile magnetic disk (e.g. a "floppy disk"), and an optical disk drive for reading from or writing to a removable, non-volatile optical disk such as a CD-ROM, DVD-ROM or other optical media can be provided. In such instances, each can be connected to bus (618) by one or more data media interfaces. As will be further depicted and described below, memory (628) may include at least one program product having a set (e.g., at least one) of program modules that are configured to carry out the functions of embodiments.

Program/utility (640), having a set (at least one) of program modules (642), may be stored in memory (628) by way of example, and not limitation, as well as an operating system, one or more application programs, other program modules, and program data. Each of the operating system, one or more application programs, other program modules, and program data or some combination thereof, may include an implementation of a networking environment. Program modules (642) generally carry out the functions and/or methodologies of the embodiments as described herein.

Computer system/server (612) may also communicate with one or more external devices (614) such as a keyboard, a pointing device, a display (624), etc.; one or more devices that enable a user to interact with computer system/server (612); and/or any devices (e.g., network card, modem, etc.) that enable computer system/server (612) to communicate with one or more other computing devices. Such communication can occur via Input/Output (I/O) interfaces (622). Still yet, computer system/server (612) can communicate with one or more networks such as a local area network (LAN), a general wide area network (WAN), and/or a public network (e.g., the Internet) via network adapter (620). As depicted, network adapter (620) communicates with the other components of computer system/server (612) via bus (618). It should be understood that although not shown, other hardware and/or software components could be used in conjunction with computer system/server (612). Examples, include, but are not limited to: microcode, device drivers, redundant processing units, external disk drive arrays, RAID systems, tape drives, and data archival storage systems, etc.

Figure 7:
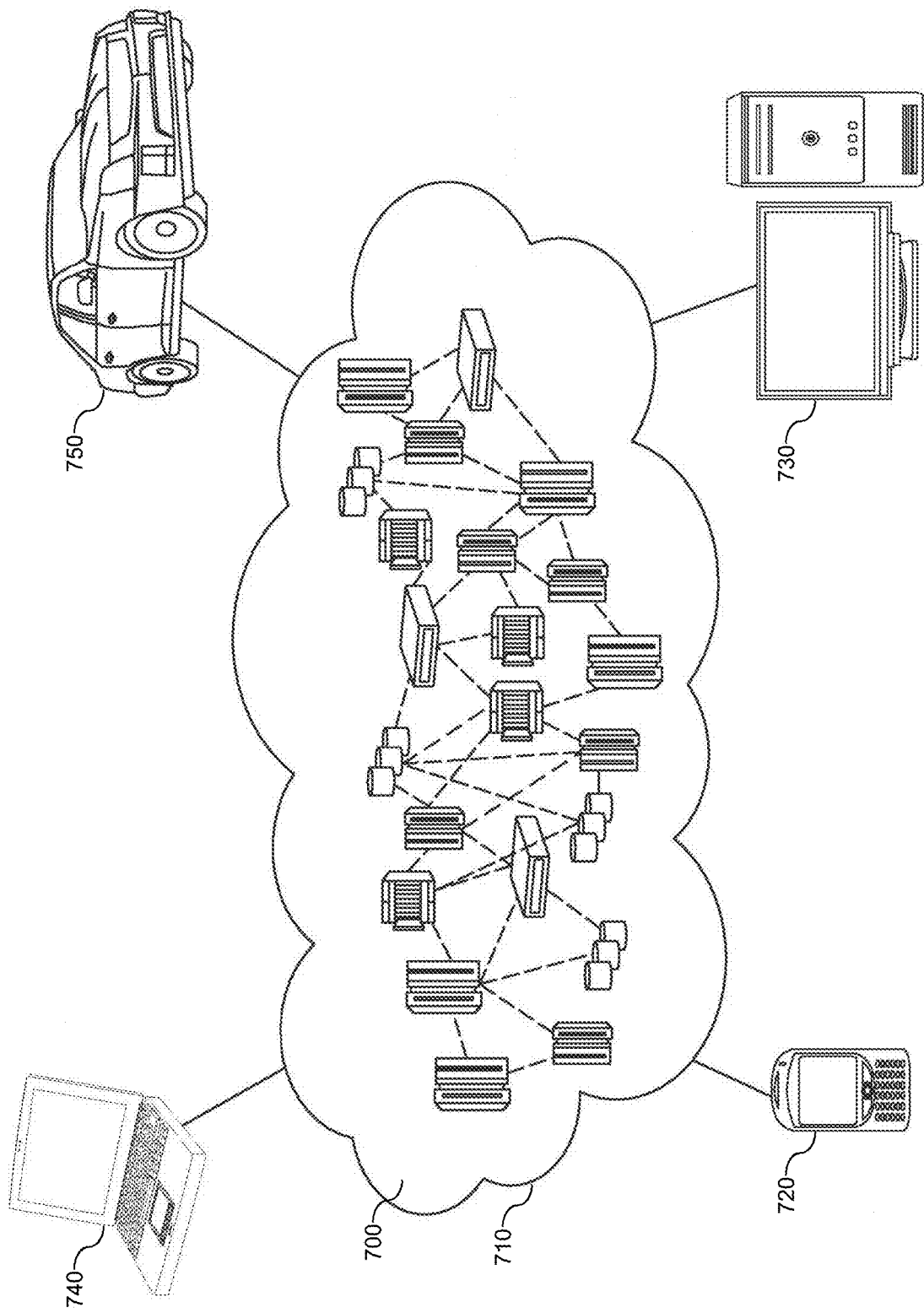
FIG. 7 depicts a block diagram illustrative of a cloud computing environment, according to an embodiment.

Referring now to FIG. 7, illustrative cloud computing environment (700) is depicted. As shown, cloud computing environment (700) includes one or more cloud computing nodes (710) with which local computing devices used by cloud consumers may communicate. Examples of these local computing devices include, but are not limited to, personal digital assistant (PDA) or cellular telephone (720), desktop computer (730), laptop computer (740), and/or automobile computer system (750). Individual nodes within nodes (710) may further communicate with one another. They may be grouped (not shown) physically or virtually, in one or more networks, such as Private, Community, Public, or Hybrid clouds as described hereinabove, or a combination thereof. This allows cloud computing environment (700) to offer infrastructure, platforms and/or software as services for which a cloud consumer does not need to maintain resources on a local computing device. It is understood that the types of computing devices (720)-(750) shown in FIG. 6 are intended to be illustrative only and that computing nodes (710) and cloud computing environment (700) can communicate with any type of computerized device over any type of network and/or network addressable connection (e.g., using a web browser).

Figure 8:
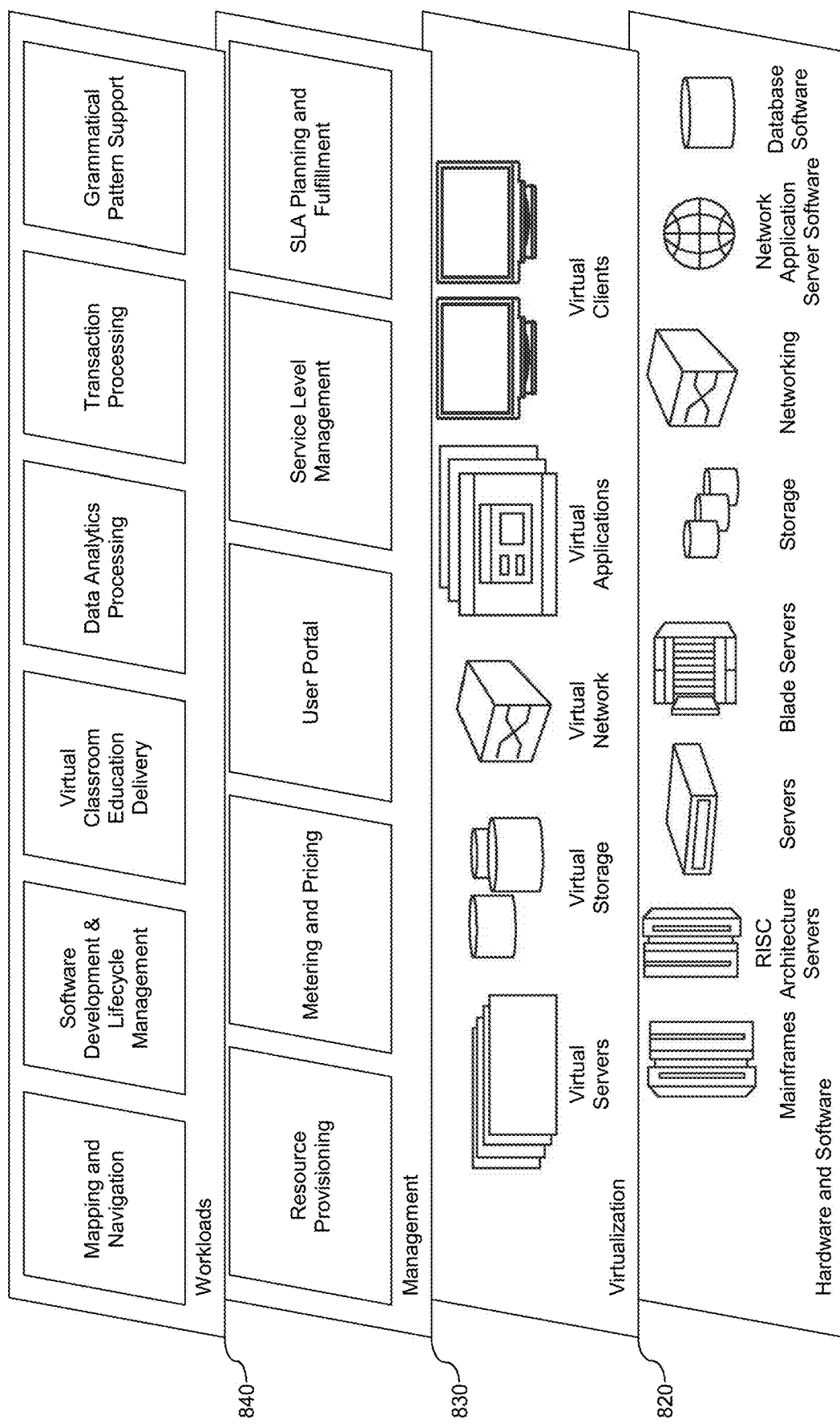
FIG. 8 depicts a block diagram illustrating a set of functional abstraction model layers provided by the cloud computing environment, according to an embodiment.

Referring now to FIG. 8, a set of functional abstraction layers provided by cloud computing environment (700) is shown. It should be understood in advance that the components, layers, and functions shown in FIG. 8 are intended to be illustrative only, and the embodiments are not limited thereto. As depicted, the following layers and corresponding functions are provided: hardware and software layer (810), virtualization layer (820), management layer (830), and workload layer (840). The hardware and software layer (810) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (820) provides an abstraction layer from which the following examples of virtual entities may be provided: virtual servers; virtual storage; virtual networks, including virtual private networks; virtual applications and operating systems; and virtual clients.

In one example, management layer (830) may provide the following functions: resource provisioning, metering and pricing, user portal, service level management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer (840) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and grammatical pattern organization support within the cloud computing environment.

In the shared pool of configurable computer resources described herein, hereinafter referred to as a cloud computing environment, files may be shared among users within multiple data centers, also referred to herein as data sites. A series of mechanisms are provided within the shared pool to provide decision making controls for access to one or more records based upon associated record access and inherent characteristics of privacy. Three knowledge bases are employed with respect to consent management, including importance, sensitivity, and relevance. Analytical techniques employ the knowledge bases to assist with making access control decisions.

As will be appreciated by one skilled in the art, the aspects may be embodied as a system, method, or computer program product. Accordingly, the aspects may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, the aspects described herein may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for the embodiments described herein may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The embodiments are described above with reference to flow chart illustrations and/or block diagrams of methods, apparatus (systems), and computer program products. It will be understood that each block of the flow chart illustrations and/or block diagrams, and combinations of blocks in the flow chart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow chart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow chart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions, which execute on the computer or other programmable apparatus, provide processes for implementing the functions/acts specified in the flow chart and/or block diagram block or blocks.

The flow charts and block diagrams in the Figures illustrate the architecture, functionality, and operation of possible implementations of systems, methods, and computer program products according to various embodiments. In this regard, each block in the flow charts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow chart illustration(s), and combinations of blocks in the block diagrams and/or flow chart illustration(s), can be implemented by special purpose hardware-based systems that perform the specified functions or acts, or combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The embodiments described herein may be implemented in a system, a method, and/or a computer program product. The computer program product may include a computer readable storage medium (or media) having computer readable program instructions thereon for causing a processor to carry out the embodiments described herein.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmissions, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The embodiments are described herein with reference to flow chart illustrations and/or block diagrams of methods, apparatus (systems), and computer program products. It will be understood that each block of the flow chart illustrations and/or block diagrams, and combinations of blocks in the flow chart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow chart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flow chart and/or block diagram block or blocks.

The corresponding structures, materials, acts, and equivalents of all means or step plus function elements in the claims below are intended to include any structure, material, or act for performing the function in combination with other claimed elements as specifically claimed. The description of the embodiments herein has been presented for purposes of illustration and description, but is not intended to be exhaustive or limited to the embodiments in the forms disclosed. Many modifications and variations will be apparent to those of ordinary skill in the art without departing from the scope and spirit of the embodiments described herein. The embodiments were chosen and described in order to best explain the principles and the practical application, and to enable others of ordinary skill in the art to understand the various embodiments with various modifications as are suited to the particular use contemplated. Accordingly, the implementation of hierarchical pattern generation shown and described herein generates a set of grammatical patterns based on a received corpus of text and evaluates the grammatical patterns of the generated set of grammatical patterns to allow for either the efficient ranking or organization of the generated grammatical patterns.

It will be appreciated that, although specific embodiments have been described herein for purposes of illustration, various modifications may be made without departing from the spirit and scope of the specific embodiments described herein. Accordingly, the scope of protection is limited only by the following claims and their equivalents.

What is claimed is:

1. A computer-implemented method for generating hierarchical patterns based on a corpus of text, the computer-implemented method comprising:

analyzing a corpus of text, including extracting a set of features of the corpus and tokenizing the extracted set of features;

generating a set of grammatical patterns based on the extracted set of features, wherein the generated set of grammatical patterns comprises at least one first grammatical pattern generated from a tokenized annotated entity and at least one second grammatical pattern generated from tokenized associated context;

evaluating the generated set of grammatical patterns based on one or more applied measures;

organizing the generated set of grammatical patterns into a hierarchy based on the evaluation, the hierarchy including:

a first tier comprising a first node comprising a first token representing a basic external grammatical pattern;

a second tier representing a next tier of the hierarchy below the first tier, the second tier comprising one or more second nodes each comprising a respective first sub-pattern, wherein at least one first sub-pattern of the respective first sub-pattern comprises the first token of the first tier and a second token representing text surrounding the basic external grammatical pattern; and using the hierarchy as a layered representation of parts of speech level patterns and finding a pattern in the hierarchy for a specific part of speech level pattern, the pattern including the annotated entity and the associated context identifying at least one grammatical pattern of the generated set of grammatical patterns as represented in the hierarchy responsive to the evaluation, and wherein the identified at least one grammatical pattern is applicable to the corpus of text and returns the identified pattern from within the corpus; and processing received input text using the hierarchy.

2. The computer-implemented method of claim 1, further comprising receiving at least one defined constraint, wherein the generated set of grammatical patterns is generated based on the received at least one defined constraint.

3. The computer-implemented method of claim 1, wherein the set of features of the corpus comprises an annotated entity and context associated with the annotated entity, and wherein an internal pattern is associated with the annotated entity and an external pattern is associated with the context.

4. The computer-implemented method of claim 3, wherein the generated set of grammatical patterns comprises an internal surface-level pattern and an internal semantic-level pattern generated from the internal pattern, and an external surface-level pattern and an external semantic-level pattern generated from the external pattern.

5. The computer-implemented method of claim 4, wherein the internal semantic-level pattern is generated based on the tokenized annotated entity, and wherein the external semantic-level pattern is generated based on the tokenized associated context.

6. The computer-implemented method of claim 1, wherein the generated set of grammatical patterns are ranked based on the evaluation.

7. The computer-implemented method of claim 1, wherein the hierarchy further comprises a third tier below the second tier, the third tier comprising one or more third nodes each comprising a respective second sub-pattern, at least one second sub-pattern being related to at least two of the second nodes and comprising the first token and the second tokens of the at least two second nodes.

8. The computer-implemented method of claim 1, wherein the hierarchy further comprises a third tier below the second tier, the third tier comprising one or more third nodes each comprising a respective second sub-pattern, at least one second sub-pattern comprising the first token and a specification of the second token.

9. The computer-implemented method of claim 1, wherein the one or more applied measures are from the group consisting of: recall, precision, and F-score.

10. A computer-implemented method for generating hierarchical patterns based on a corpus of text, the computer-implemented method comprising:

analyzing a corpus of text, including extracting a set of features of the corpus and tokenizing the extracted set of features;

generating a set of grammatical patterns based on the extracted set of features, wherein generated the set of grammatical patterns comprises at least one first grammatical pattern generated from a tokenized annotated entity and at least one second grammatical pattern generated from tokenized associated context;

evaluating the generated set of grammatical patterns based on one or more applied measures;

organizing the generated set of grammatical pattern into a hierarchy based on the evaluation, the hierarchy including:

a first tier comprising a first node comprising a first token representing a basic external grammatical pattern; and a second tier representing a next tier of the hierarchy below the first tier, the second tier comprising one or more second nodes each comprising a respective first sub-pattern, wherein at least one first sub-pattern of the respective first sub-pattern comprises the first token of the first tier and a second token representing text surrounding the basic external grammatical pattern; and returning the hierarchy as a layered representation of parts of speech level patterns and finding a pattern in the hierarchy for a specific part of speech level pattern, the pattern including the annotated entity and the associated context identifying at least one grammatical pattern of the generated set of grammatical patterns as represented in the hierarchy responsive to the evaluation and wherein the identified at least one grammatical pattern is applicable to the corpus of text and return the identified pattern from within the corpus; and processing received input text using the hierarchy.

11. The computer-implemented method of claim 10, wherein the annotated entity comprises a computer readable characterization manually annotated by a user.

12. The computer-implemented method of claim 10, further comprising receiving at least one defined constraint, wherein the generated set of grammatical patterns is generated based on the received at least one defined constraint.

13. The computer-implemented method of claim 10, wherein the set of features of the corpus comprises an annotated entity and context associated with an annotated entity, and wherein the internal pattern is associated with the annotated entity and an external pattern is associated with the context.

14. The computer-implemented method of claim 13, wherein the generated set of grammatical patterns comprises an internal surface-level pattern and an internal semantic-level pattern generated from the internal pattern, and an external surface-level pattern and an external semantic-level pattern generated from the external pattern.

15. The computer-implemented method of claim 14, wherein the internal semantic-level pattern is generated based on the tokenized annotated entity, and wherein the external semantic-level pattern is generated based on the tokenized associated context.

16. The computer-implemented method of claim 10, wherein the generated set of grammatical patterns are ranked based on the evaluation.

17. The computer-implemented method of claim 10, wherein the hierarchy further comprises a third tier below the second tier, the third tier comprising one or more third nodes each comprising a respective second sub-pattern, at least one second sub-pattern being related to at least two of the second nodes and comprising the first token and the second tokens of the at least two second nodes.

18. The computer-implemented method of claim 10, wherein the hierarchy further comprises a third tier below the second tier, the third tier comprising one or more third nodes each comprising a respective second sub-pattern, at least one second sub-pattern comprising the first token and a specification of the second token.

19. The computer-implemented method of claim 10, wherein the one or more applied measures are from the group consisting of: recall, precision, and F-score.

* * * * *